(12) United States Patent
Singh et al.

(10) Patent No.: US 11,436,333 B2
(45) Date of Patent: Sep. 6, 2022

(54) BIOS/BOOTLOADER PROTECTION

(71) Applicant: Cisco Technology, Inc., San Jose, CA (US)

(72) Inventors: Chandan Singh, Bangalore (IN); Chandrashekar Sodankoor, Bangalore (IN); Chirag Shroff, Cary, NC (US); Gregory James Waldschmidt, Austin, TX (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 234 days.

(21) Appl. No.: 16/378,068

(22) Filed: Apr. 8, 2019

(65) Prior Publication Data

US 2020/0320200 A1     Oct. 8, 2020

(51) Int. Cl.
*G06F 9/4401*     (2018.01)
*G06F 21/57*     (2013.01)
*G06F 8/65*     (2018.01)

(52) U.S. Cl.
CPC .............. *G06F 21/575* (2013.01); *G06F 8/65* (2013.01); *G06F 9/4401* (2013.01)

(58) Field of Classification Search
CPC ........ G06F 21/575; G06F 9/4401; G06F 8/65; G06F 21/572; G06F 8/654; G06F 8/63
USPC .................................................. 713/1–194, 2
See application file for complete search history.

(56) References Cited

U.S. PATENT DOCUMENTS

| 7,337,309 | B2 | 2/2008 | Nguyen et al. |
| 8,904,162 | B2 * | 12/2014 | Futral ................. G06F 11/1433 713/2 |
| 9,147,074 | B2 | 9/2015 | Grieco et al. |
| 9,672,362 | B2 * | 6/2017 | Butcher ................. G06F 21/51 |
| 2010/0077199 | A1 | 3/2010 | Hobson et al. |
| 2011/0119474 | A1 | 5/2011 | Singh et al. |
| 2011/0131447 | A1 | 6/2011 | Prakash et al. |

(Continued)

FOREIGN PATENT DOCUMENTS

| CN | 1529236 A | 9/2004 |
| WO | 2018199893 A1 | 11/2018 |

OTHER PUBLICATIONS

Andrew Regenscheid, National Institute of Standards and Technology, "Platform Firmware Resiliency Guidelines", NIST Special Publication 800-193, https://doi.org/10.6028/NIST.SP.800-193, May 2018, 45 pages.

*Primary Examiner* — Paul Yen
(74) *Attorney, Agent, or Firm* — Edell, Shapiro & Finnan, LLC

(57) ABSTRACT

Presented herein are methodologies for securing BIOS/bootloader function including booting a computer system from a BIOS image stored in a first boot flash device, detecting an indication of a pending BIOS upgrade, in response to detecting the indication of a pending BIOS upgrade, accessing an upgraded BIOS image stored on a second boot flash device, validating a version of the upgraded BIOS image, authenticating the upgraded BIOS image using a signature stored in a first region of the second boot flash device, when the version of the upgraded BIOS image is validated, and the upgraded BIOS image is authenticated, writing the signature to a second region of the second boot flash device that is different from the first region, locking the second region of the second boot flash device, and rebooting the computer system from the second boot flash device.

20 Claims, 11 Drawing Sheets

(56) References Cited

U.S. PATENT DOCUMENTS

2013/0031538 A1    1/2013  Skalsky
2014/0359268 A1*  12/2014  Jauhiainen ............. G06F 21/44
                                                   713/2
2020/0310774 A1*  10/2020  Zhu ....................... G06F 9/4401

* cited by examiner

BIOS/BOOTLOADER PROTECTION

TECHNICAL FIELD

The present disclosure relates to secure loading of an upgraded basic input output system (BIOS) image.

BACKGROUND

Computing devices typically store one or more copies of firmware in non-volatile memory to initialize hardware after powering on the device. For instance, a computing device may store Basic Input/Output System (BIOS) firmware in a boot flash memory to enable the processor to boot an operating system for the computer. In some instances, a computing device may store more than one version of the firmware to provide a backup copy of firmware to prevent the operating system from inadvertently corrupting the BIOS firmware. A maliciously compromised operating system may directly overwrite the boot flash memory, wiping out all versions of the firmware, and rendering the computing device vulnerable, or even useless.

BIOS firmware may be secured from being compromised by implementing a secure BIOS update process. In one possible BIOS update process, the operating system writes an update package to computer readable media other than the boot flash, and, on the next reset of the computing device, the BIOS fetches the update package, verifies the update package is authentic, and installs the package. The operating system is otherwise prevented from accessing the BIOS region in the boot flash, for example, with protected range registers provided by the processor architecture.

DESCRIPTION OF EXAMPLE EMBODIMENTS

Overview

Presented herein are methodologies for securing BIOS/bootloader function including booting a computer system from a BIOS image stored in a first boot flash device, detecting an indication of a pending BIOS upgrade, in response to detecting the indication of a pending BIOS upgrade, accessing an upgraded BIOS image stored on a second boot flash device, validating a version of the upgraded BIOS image, authenticating the upgraded BIOS image using a signature stored in a first region of the second boot flash device, when the version of the upgraded BIOS image is validated, and the upgraded BIOS image is authenticated, writing the signature to a second region of the second boot flash device that is different from the first region, locking the second region of the second boot flash device, and rebooting the computer system from the second boot flash device.

A device for securing BIOS/bootloader function is also presented. The device includes a memory, and one or more processors coupled to the memory, and configured to: boot a computer system from a BIOS image stored in a first boot flash device, detect an indication of a pending BIOS upgrade, in response to detecting the indication of a pending BIOS upgrade, access an upgraded BIOS image stored on a second boot flash device, validate a version of the upgraded BIOS image, authenticate the upgraded BIOS image using a signature stored in a first region of the second boot flash device, when the version of the upgraded BIOS image is validated, and the upgraded BIOS image is authenticated, write the signature to a second region of the second boot flash device that is different from the first region, lock the second region of the second boot flash device, and reboot the computer system from the second boot flash device.

Example Embodiments

Figure 1:
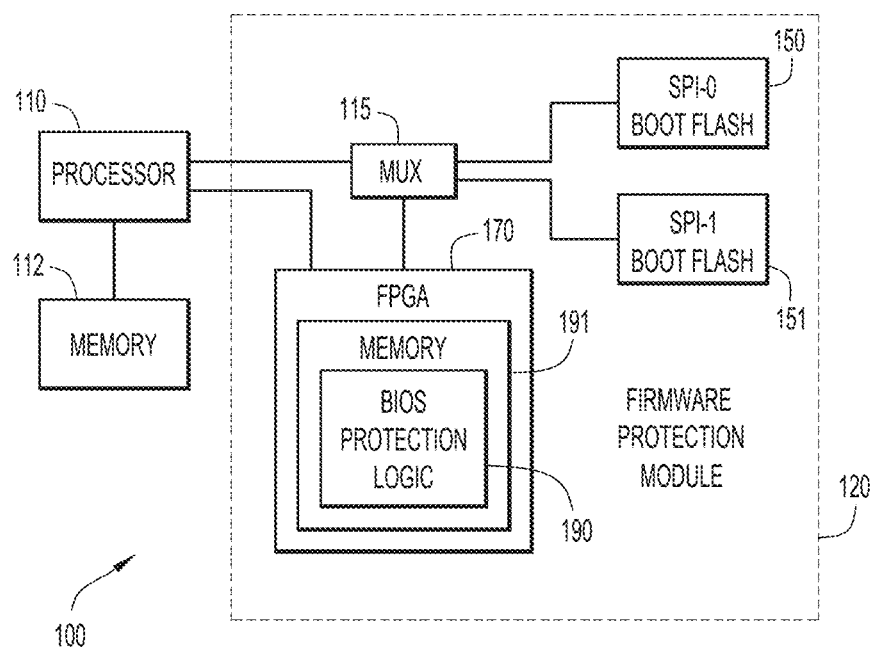
FIG. 1 depicts components of a computer system including BIOS protection logic in accordance with an example embodiment.

FIG. 1 depicts components of a computer system 100 including BIOS protection logic 190 in accordance with an example embodiment. The computer system 100 includes a processor 110 (such as a central processing unit (CPU)) that is in communication with memory 112 and with a firmware protection module 120. Firmware protection module 120 includes a multiplexer 115 that enables, under the control of FPGA 170 and BIOS protection logic 190 hosted thereon in memory 191, the processor 110 to access at least selected portions of boot flash devices 150, 151. Boot flash devices 150, 151 may be in communication with the processor via, e.g., the serial peripheral interface (SPI), and thus may be referred to as SPI-0 (boot flash device) 150 and SPI-1 (boot flash device) 151.

The processor 110 may include one or more processing units that are configured to load firmware (e.g., BIOS firmware) from SPI-0 150 or SPI-1 151. The memory 112 may include read only memory (ROM), random access memory (RAM), magnetic disk storage media devices, optical storage media devices, flash memory devices, electrical, optical, or other physical/tangible memory storage devices. Likewise, memory 191 of FPGA 170 may include read only memory (ROM), random access memory (RAM), magnetic storage media devices, optical storage media devices, flash memory devices, electrical, optical, or other physical/tangible memory storage devices. Thus, in general, the memory 112 and 191 may include one or more tangible (non-transitory) computer readable storage media (e.g., a memory device) encoded with software or firmware comprising computer executable instructions, and when the instructions are executed (by the processor 110 or FPGA 170) they are able to perform the operations described herein.

At a high level, the methodology described herein achieves BIOS protection by designating one of the boot flash devices 150, 151 as "active" and the other as "standby." The active boot flash device is fully locked, thus precluding an attacker from maliciously changing the BIOS stored therein. On the other hand, selected regions or memory partitions of the standby boot flash device are unlocked (while others regions remain locked). An application (e.g., an operating system stored in memory 112 and executed by processor 110) is permitted to modify the unlocked regions of the standby boot flash device.

As will be explained in more detail below, the described BIOS protection methodology provides several advantages including no longer having to rely on a "golden" version of BIOS, significantly reducing downtime of the computer system when a BIOS upgrade is indicated, and preventing so-called downgrade attacks (where a malicious actor might load an older, yet nevertheless still authentic, version of BIOS, wherein that version of BIOS might no longer be desired in light of known vulnerabilities).

Figure 2A:
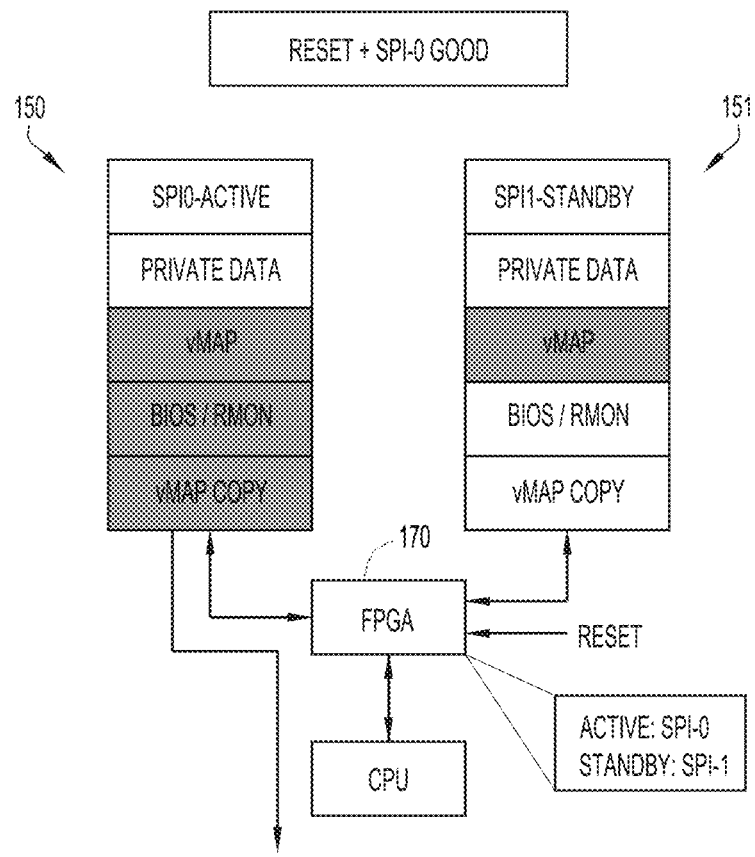
FIGS. 2A and 2B depict locked and unlocked states of memory partitions of serial peripheral interface (SPI) boot flash devices in accordance with an example embodiment.
Figure 2B:
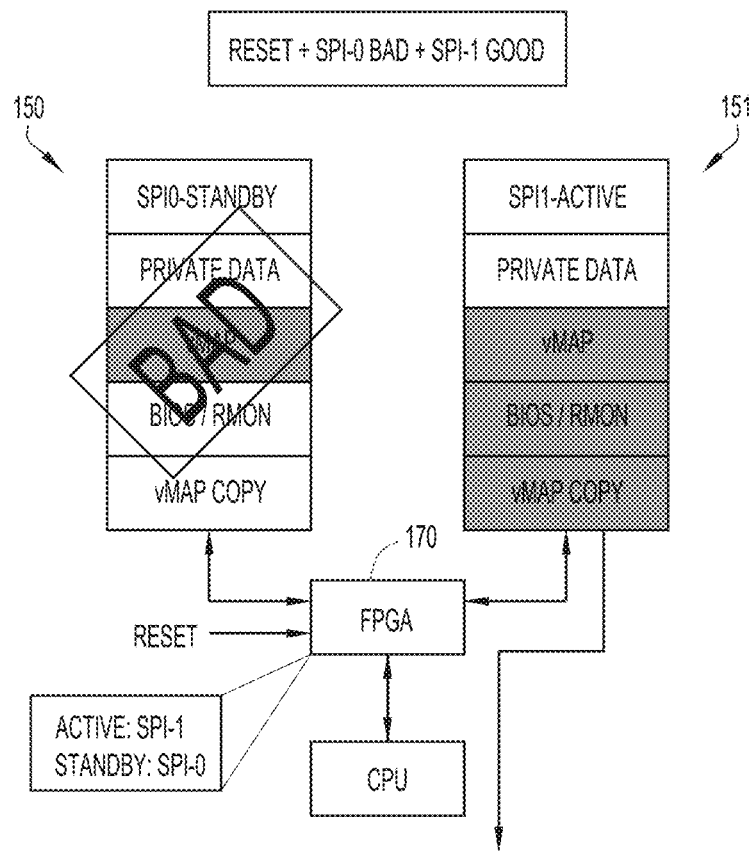

FIGS. 2A and 2B depict locked and unlocked states of memory partitions of serial peripheral interface (SPI) boot flash devices 150, 151, and how those devices are used in a booting sequence, in accordance with an example embodiment. As shown in FIG. 2A, SPI-0 150 is indicated as the active boot flash device. This designation is made by the FPGA 170 (not, e.g., the operating system). SPI-1 151 is indicated as the standby boot flash device. Each boot flash device is partitioned in a same manner with, in this particular implementation, the following fields, and their respective functions:

PRIVATE DATA—data not related to the present embodiments, but which might be stored in a boot flash device, depending on a given implementation vMAP—a signature of BIOS/RMON (ROM Monitor or pre-boot code)

BIOS/RMON—BIOS/Rommon/Bootloader code vMAP Copy—a signature of an upgraded version of BIOS/RMON/Bootloader code These same partitions are also applicable to the other figures discussed herein, and are accessed and/or unlocked/locked as explained below, and as shown in the drawings.

Referring to FIG. 2A, assume that SPI-0 150 is designated as the active boot flash device. As such, on power up, FPGA 170 selects, e.g., via controlling multiplexer 115, the Active SPI (SPI-0) based on boot select (e.g., a register bit allocated in the FPGA 170). FPGA 170 then authenticates the BIOS stored in SPI-0 and, assuming the BIOS is authenticated, boots from Active SPI-0 150. Rommon (or RMON) (ROM Monitor or pre-boot code) is then configured to check if there is a pending BIOS upgrade request. That is, the operating system (via processor 110) can indicate to the FPGA 170 that a BIOS upgrade is pending, and the Rommon can detect such a state, and act on it accordingly.

As the boot process continues, the Rommon locks Active SPI-0 150. The Rommon also locks Standby SPI-1 151 except the BIOS, and vMAP copy partitions (wherein those partitions are made available to receive upgraded BIOS, at a later stage). The Rommon then loads/boots the operating system. As suggested, at this time, the standby SPI-1 BIOS/Rommon region, which remains unlocked, is available for upgrade via the operating system.

FIG. 2B illustrates a scenario in which the BIOS on the active SPI boot flash device fails to authenticate. As in the case of FIG. 2A, assume that SPI-0 150 is designated as the active boot flash device. As such, on power up, FPGA 170 selects, e.g., via controlling multiplexer 115, the Active SPI (SPI-0) based on boot select (e.g., a register bit saved in the FPGA 170). FPGA 170 then attempts to authenticate the BIOS stored in SPI-0, but that BIOS fails to authenticate. As such, as a failover, FPGA 170 loads and attempts to authenticate the BIOS from SPI-1 151 (and SPI-1 thereafter becomes active).

Assuming the BIOS from SPI-1 151 is authenticated, the boot process continues from now-active SPI-1 151. The Rommon (from SPI-1) is then configured to check if there is a pending BIOS upgrade request. The Rommon is further configured to lock active SPI-1. The Rommon also locks Standby SPI-0 150 except the BIOS and vMAP copy partitions (where those partitions are made available to receive upgraded BIOS, at a later stage). The Rommon then loads/boots the operating system. The standby SPI-0 150 BIOS/Rommon region, which remains unlocked, is available for upgrade via the operating system.

To be clear, the operations depicted by FIG. 2B do not include any BIOS upgrade function, but do illustrate the ability of the system to failover to a standby SPI boot flash device in the event a designated active SPI boot flash device fails to supply an authenticated BIOS image.

Figure 2C:
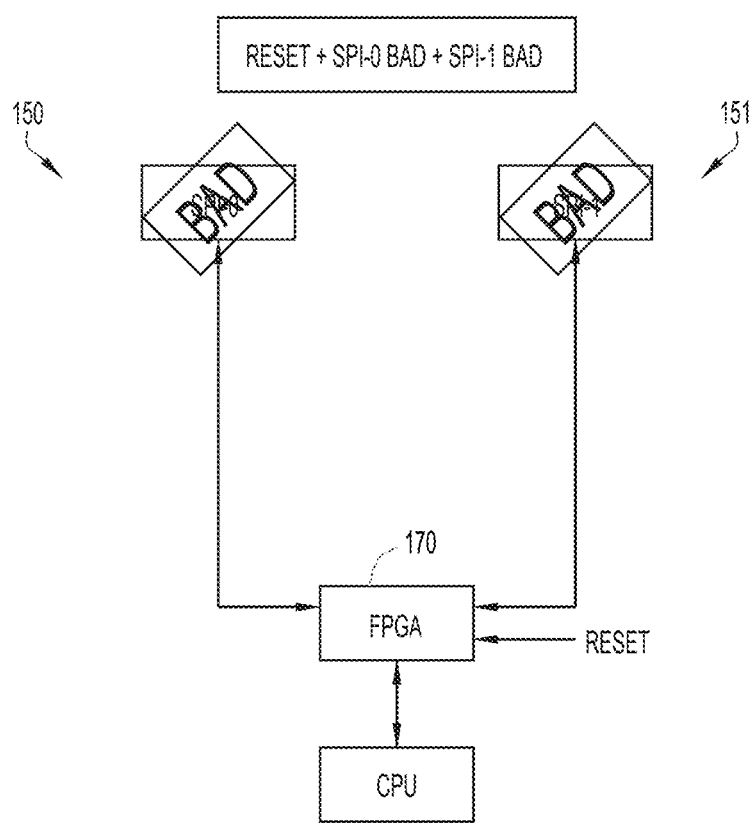
FIG. 2C depicts a condition when BIOS stored on both SPI boot flash devices fails to authenticate.

FIG. 2C depicts a condition when BIOS stored on both SPI boot flash devices 150, 151 fail to authenticate. Such a computer 100 (e.g., server blade, mother board, etc.), which might have experienced a hardware failure, and was unable to authenticate any BIOS image, would then likely be returned to a manufacturer or service provider for refurbishment/repair.

The methodology described herein is designed to provide protection in the context of BIOS upgrade, with improved computer system uptime and protection against rollback attempts. FIGS. 3-5B illustrate three stages related to upgrading BIOS in one of the SPI boot flash devices 150 or 151.

Figure 3:
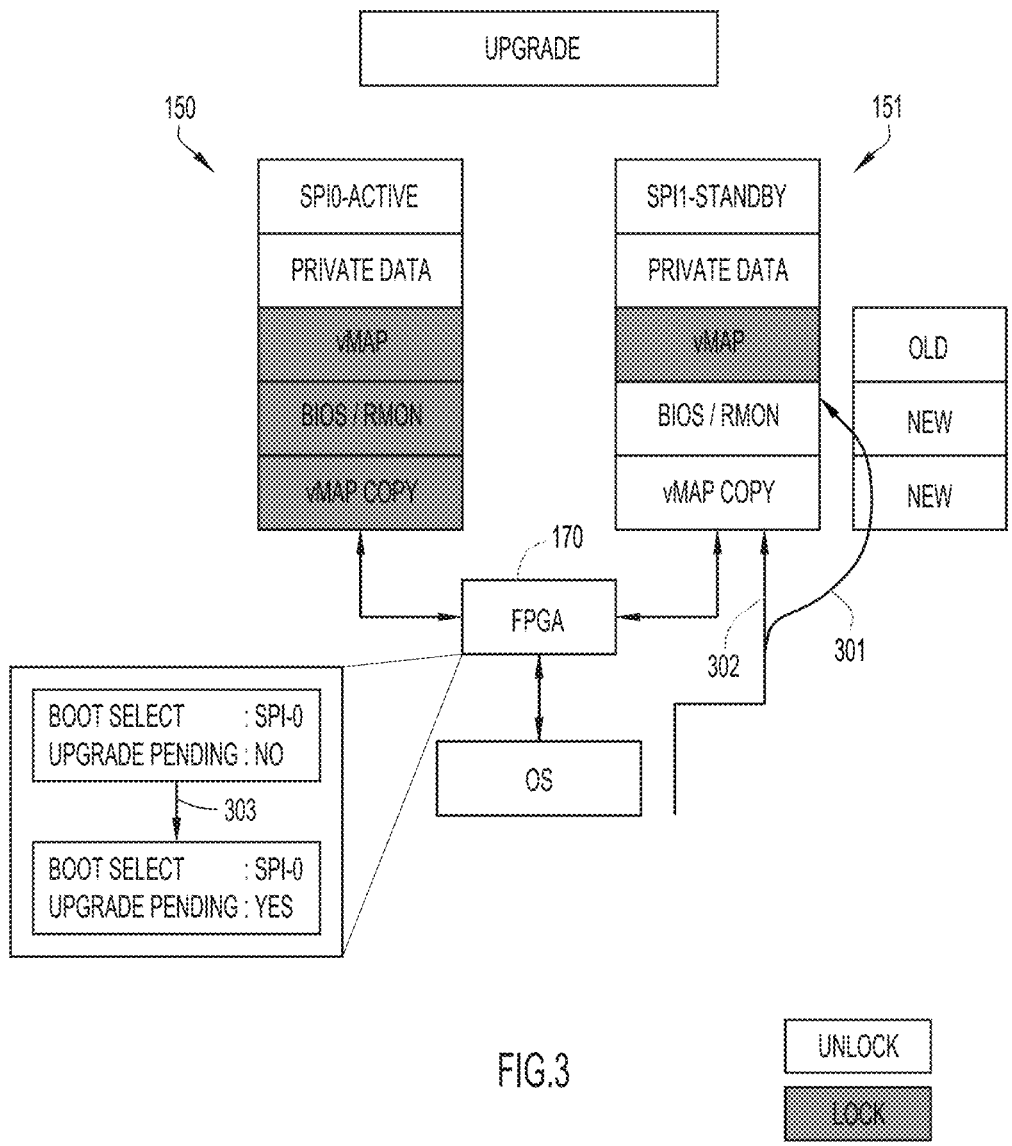
FIG. 3 depicts a series of operations for upgrading a SPI boot flash device that is in standby in accordance with an example embodiment.

FIG. 3 depicts a series of operations for upgrading an SPI boot flash device that is in standby in accordance with an example embodiment. In the embodiment, an upgrade script executing as part of the operating system, in conjunction with logic 190, checks the boot select indication in FPGA 170 to know which boot flash device is in standby (in this case SPI-1 151). The operating system may be further configured to compare or validate the version of any purported upgraded BIOS. Comparison or validation may be performed, for instance, with respect to version data in a trusted database. If the Rommon validates, then at 301, the new, upgraded, BIOS/Rommon is written to the unlocked designated partition of the standby SPI-1 151. It is noted that the operation of writing such code to standby SPI-1 151 may take several minutes. Notably, however, the computer system 100 is still running based on a prior boot sequence from active SPI-0 150 and, as such, the computer system 100, as will become apparent, will have less overall downtime in the course of a BIOS upgrade.

At 302, a signature of the upgraded BIOS is also written to the vMAP copy region of standby SPI-1. The actual vMAP (or signature) region remains locked. The operating system may then indicate to the FPGA 170 that an upgrade is pending, and the FPGA, at 303, records such an indication. The sequence ends at this point until the system is reset. The boot select (i.e., which boot flash device 150 or 151) is locked from the perspective of the operating system. That is, when the computer system is reset, the FPGA 170 will force the multiplexer 115 to connect the active boot flash device to the processor 110.

Figure 4:
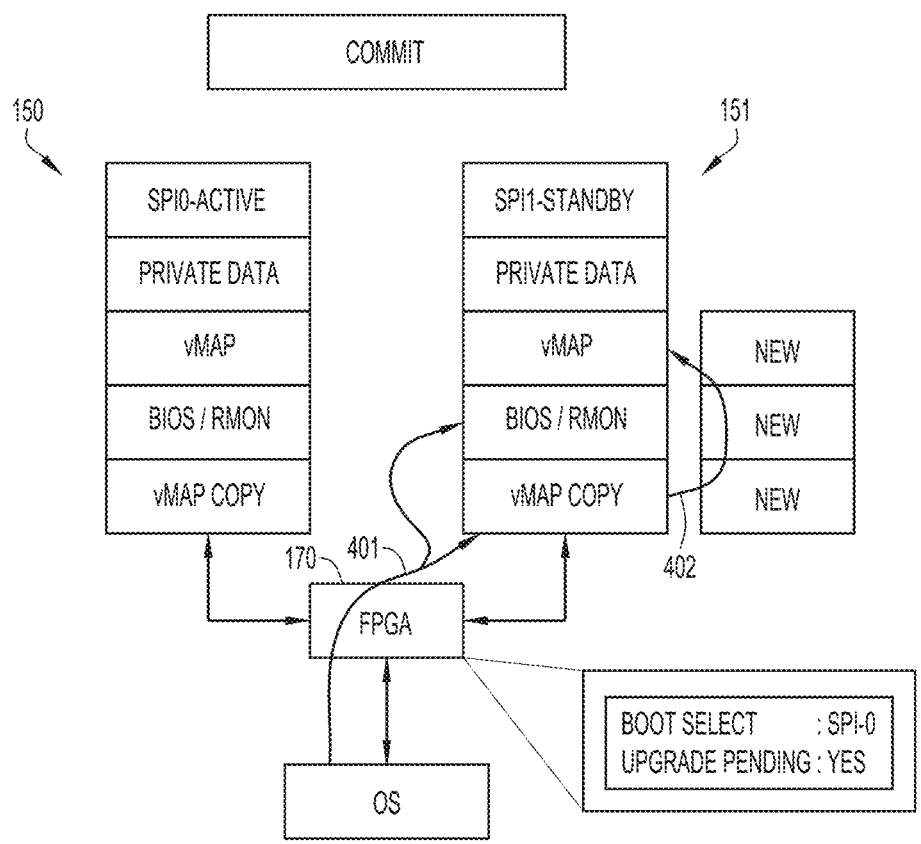
FIG. 4 depicts a series of operations for committing updated BIOS in a SPI boot flash device that is in standby in accordance with an example embodiment.

FIG. 4 depicts a series of operations for committing updated BIOS in an SPI boot flash device that is in standby in accordance with an example embodiment. When the computer system 100 is reset, the FPGA 170 will validate and boot from one of the boot flash devices, in this case SPI-0 150, which was active prior to the reset. At this stage, both boot flash devices 150, 151 are configured to be in an unlocked state. The Rommon then detects the pending upgrade in the FPGA 170. As a result, the Rommon performs a version check and runs signature verification on BIOS/RMON code in the standby SPI 151, using the signature in the vMAP Copy partition, as indicated by 401. If these operations are successful, then the value (signature) in the vMap Copy partition is written to the vMap partition, as indicated by 402. In accordance with an embodiment, vMAP Copy of a lower, or older, version would not be permitted to be written to the standby boot flash device's vMAP region. This functionality addresses the issue of a rollback attack by eliminating the possibility that an earlier version of BIOS may be maliciously installed.

Figure 5A:
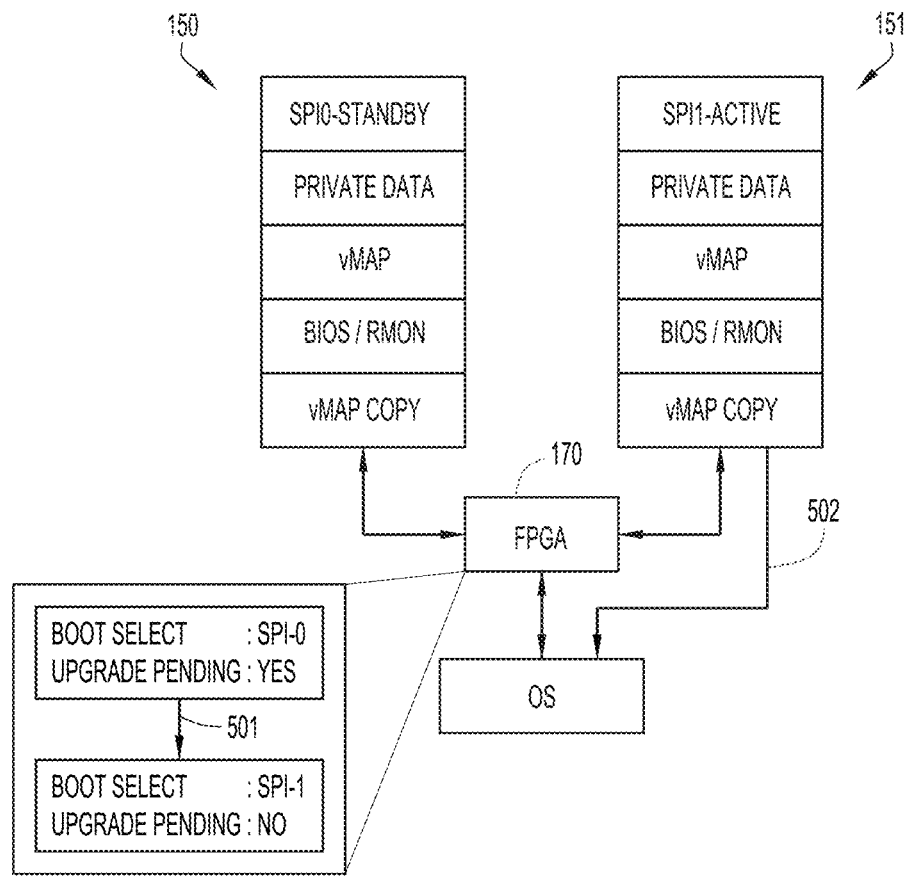
FIGS. 5A and 5B depict a series of operations for activating a SPI boot flash device that was previously in standby in accordance with an example embodiment.
Figure 5A:
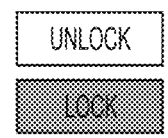
Figure 5B:
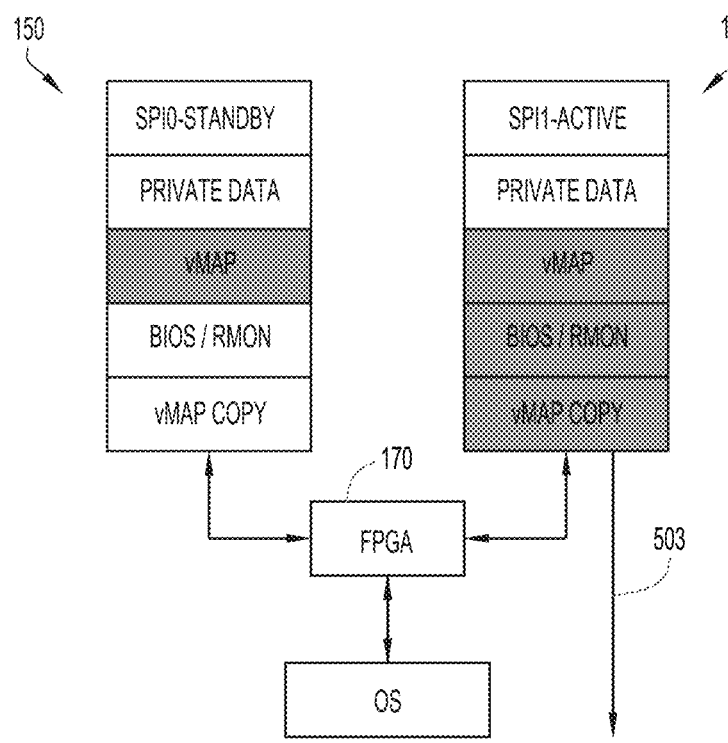
Figure 5B:
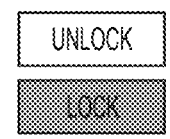

FIGS. 5A and 5B depict a series of operations for activating an SPI boot flash device that was previously in standby in accordance with an example embodiment. When the computer system 100 boots from an active SPI boot flash device, and an upgrade indication is pending, the FPGA 170 will clear the upgrade pending indication, and change the boot select to the standby boot flash device 151 (SPI-1) such that, upon the next reset, the boot flash device 151 becomes active, as shown at 501. In the sequence of the embodiment, the FPGA 170 then resets and enables access to SPI-1, boot flash device 151, and validates/boots with new active SPI-1, as shown by 502. The Rommon then locks the partitions of active boot flash device SPI-1 and locks the partitions of standby boot flash device SPI-0 (except BIOS, vMAP Copy, as shown in FIG. 5B and operation 503.

Figure 6:
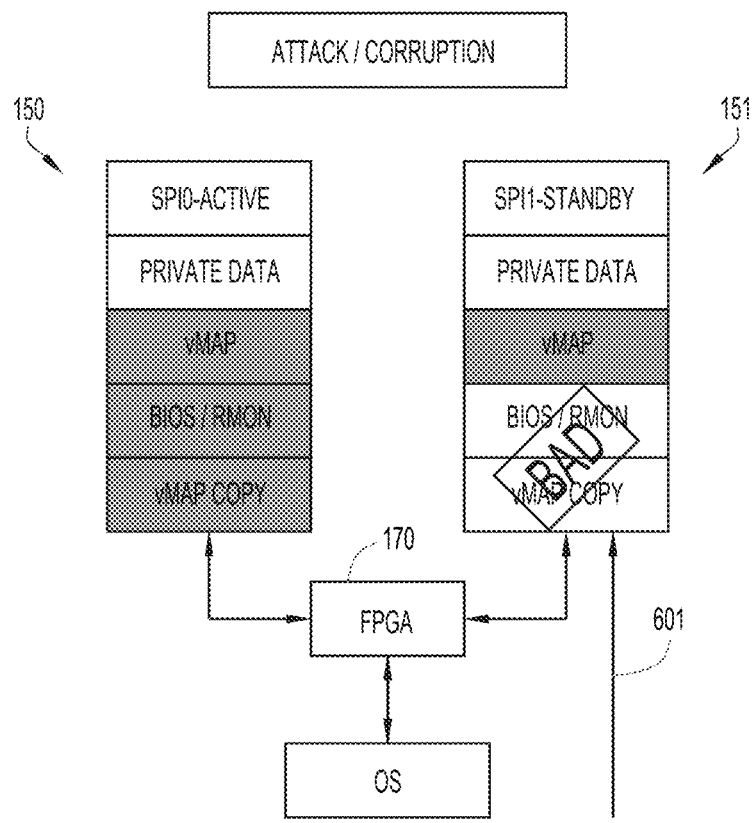
FIG. 6 illustrates how the described approach protects against attempted attacks and corrupt BIOS that may be written to a boot flash device in standby in accordance with an example embodiment.

FIG. 6 illustrates how the described approach protects against attempted attacks and corrupt BIOS that may be written to a boot flash device in standby. In accordance with an example embodiment, the operating system can only write (or corrupt) BIOS/RMON and vMAP Copy data in standby SPI-1 151, at operation 601. The vMAP region used by a secure boot microloader (ML) is locked, and thus cannot be corrupted. Furthermore, the operating system is not given the option to select which SPI boot flash device to boot. In the present embodiments, only the FPGA 170 has the ability to designate which boot flash device is to be active. The operating system can only indicate whether an upgrade is pending. On reset or power-cycle, the FPGA 170 and associated ML uses the signature in the vMAP region to authenticate a newly upgraded (and potentially corrupted) BIOS/RMON region. Since the vMAP region is not updated with vMAP copy (until after authentication), and in the event the BIOS/RMON is corrupted, authentication fails and the FPGA 170 switches to the other boot flash device.

Figure 7:
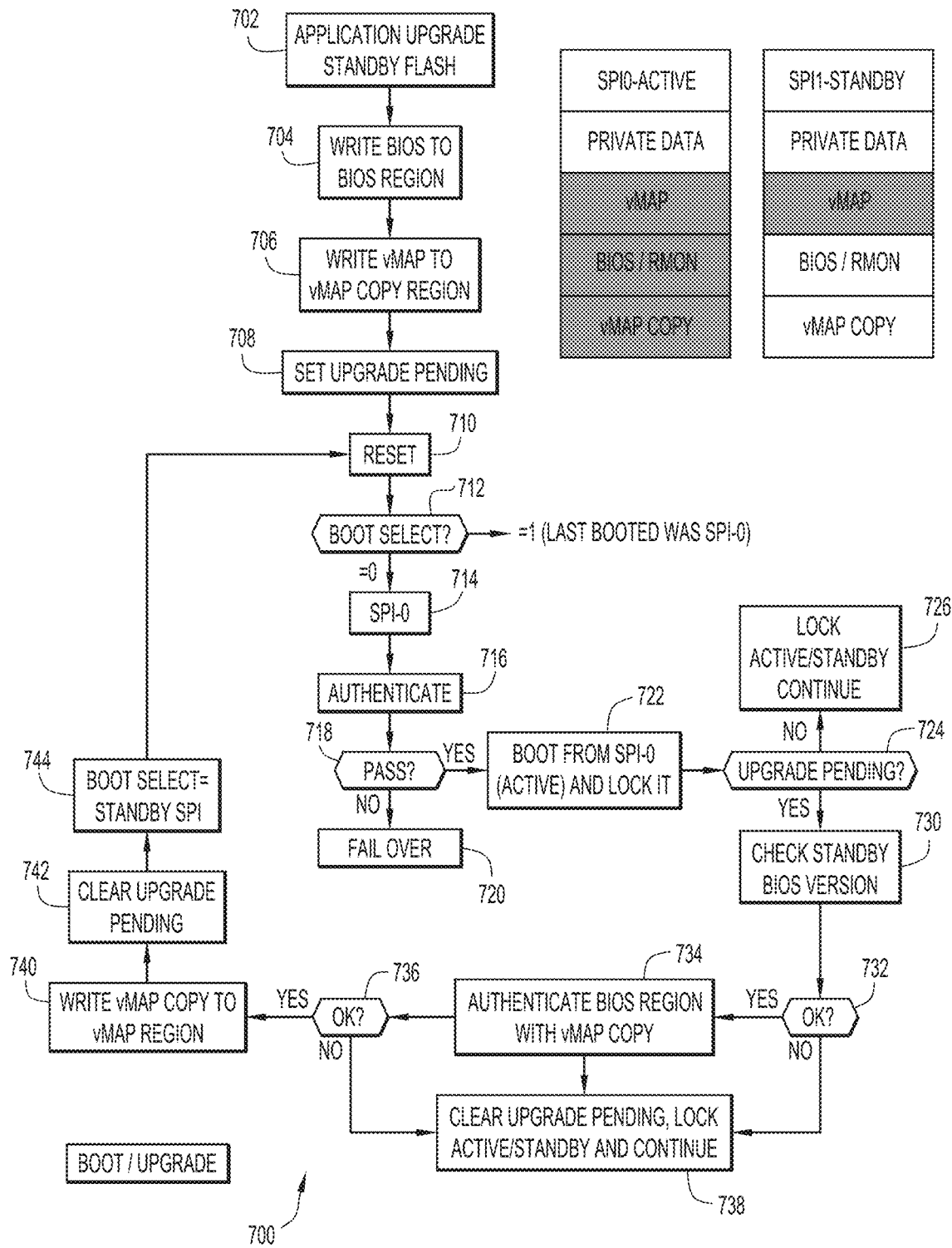
FIG. 7 is a flow chart depicting a series of operations to protect BIOS upgrade and bootloader functions in accordance with an example embodiment.

FIG. 7 is a flow chart depicting a series of operations 700 to protect BIOS upgrade and bootloader functions in accordance with an example embodiment. At 702 an operating system of a computer system determines that a BIOS upgrade is it to be made to the computer system. At 704, the operating system writes the new (upgraded) BIOS to the BIOS region of a standby boot flash device. At 706, a signature of the new BIOS is written to a vMap copy region of the standby boot flash device. At 708 the operating system notifies, e.g., an FPGA, that an upgrade to BIOS is pending. At 710 the computer system is reset.

At 712, the FPGA determines which boot flash device is to be used to boot the computer system. In this case, SPI-0 is selected at operation 714, i.e., SPI-0 has been designated as active. At 716, the BIOS in the active boot flash device is authenticated. If, at 718, authentication fails for the BIOS in the active boot flash device, then the system can fail over to boot flash device standby, at 720. If, at 718, authentication passes, then the active boot flash device is used to boot the computer system and the active boot flash device is locked, as indicated in 722. The FPGA then determines, at 724, whether an upgrade is pending. If no upgrade is pending at 724, then, at 726, both of the active and standby boot flash devices are locked except for selected memory partitions, as explained previously. If, at 724, it is determined that an upgrade is pending, then, e.g., microloader code, at 730, checks the version of the BIOS that is stored in the standby boot flash device. If, at 732, the version is determined not to be acceptable, then, at 738, the indication that an upgrade is pending is cleared and both the active and standby boot flash devices are locked (except for those partitions that remain unlocked, as discussed previously). If, at 732, the BIOS version stored in the standby boot flash device is acceptable, then, at 734, the BIOS in the standby boot flash device is authenticated using the signature stored in the vMap copy region of the boot flash device.

If the BIOS is not authenticated, then, at 738, the indication that an upgrade is pending is cleared, and both of the active and standby boot flash devices are locked (except for those partitions that remain unlocked, as discussed previously). If the BIOS in the standby boot flash device is authenticated, then, at 740, the signature stored in the vMap copy region is written to the vMap region of the standby boot flash device. At 742, the indication that an upgrade is pending is cleared from the FPGA. Further at 744, the FPGA indicates that the standby boot flash device is "selected" as the active boot device, and, at 710, the computer system is again reset so that the computer system will thereafter boot using the newly-upgraded BIOS stored in what used to be the standby boot flash device, but which is now designated as the active boot flash device.

One of the significant benefits of the embodiments described herein is the potential for reduced downtime of the computer system, in the context of BIOS upgrade. It is noted that it might take up to 4-5 minutes to write a new 8 MB BIOS image to a boot flash device. In this instant embodiments, the operating system writes the new BIOS and signature (vMap) copy to the standby boot flash device. Then, upon reset, the only write operation that occurs is to copy the signature (e.g., 64 k of data) from the vMap Copy region to the vMap region once new BIOS version check and authentication is successful. Writing 64 k of data is much faster than writing a whole 8 MB image. As such, the booting process with upgraded BIOS may occur in seconds, rather than minutes.

Figure 8:
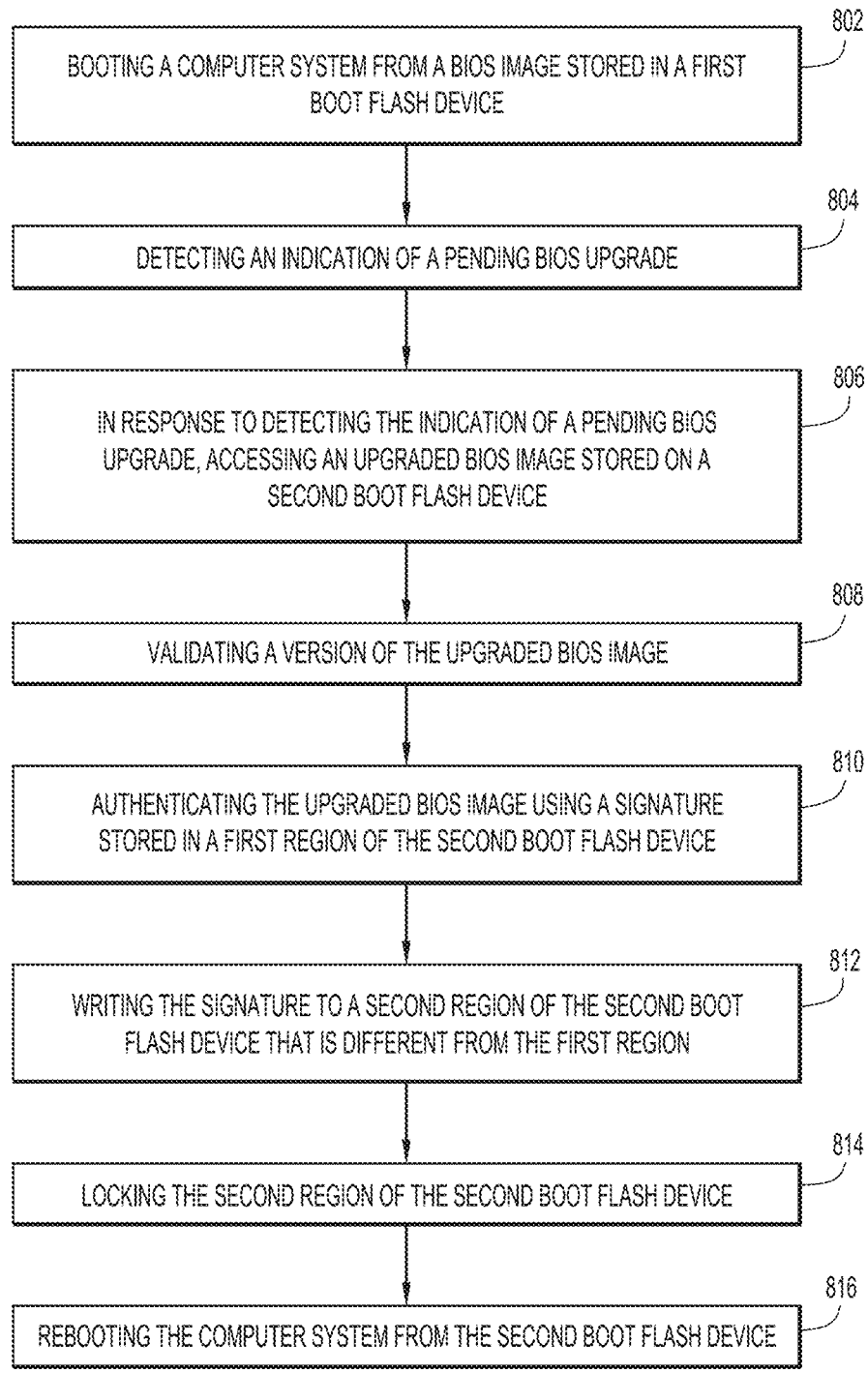
FIG. 8 is another flow chart depicting a series of operations to protect BIOS upgrade and bootloader functions in accordance with an example embodiment.

FIG. 8 is another flow chart depicting a series of operations to protect BIOS upgrade and bootloader functions in accordance with an example embodiment. At 802, the methodology includes booting a computer system from a BIOS image stored in a first (e.g., active) boot flash device. At 804, the methodology includes detecting an indication of a pending BIOS upgrade. At 806, in response to detecting the indication of a pending BIOS upgrade, the methodology includes accessing an upgraded BIOS image stored on a second (e.g., standby) boot flash device. At 808, the methodology includes validating a version of the upgraded BIOS image. At 810, the methodology includes authenticating the upgraded BIOS image using a signature stored in a first region of the second boot flash device. At 812, the methodology includes writing the signature to a second region of the second boot flash device that is different from the first region. At 814, the methodology includes locking the second region of the second boot flash device. And, at 816, the methodology includes rebooting the computer system from the second boot flash device.

The programs described herein are identified based upon the application for which they are implemented in a specific embodiment. However, it should be appreciated that any particular program nomenclature herein is used merely for convenience, and thus the embodiments should not be limited to use solely in any specific application identified and/or implied by such nomenclature.

Data relating to operations described herein may be stored within any conventional or other data structures (e.g., files, arrays, lists, stacks, queues, records, etc.) and may be stored in any desired storage unit (e.g., database, data or other repositories, queue, etc.). The data transmitted between entities may include any desired format and arrangement, and may include any quantity of any types of fields of any size to store the data. The definition and data model for any datasets may indicate the overall structure in any desired fashion (e.g., computer-related languages, graphical representation, listing, etc.).

The present embodiments may employ any number of any type of user interface (e.g., Graphical User Interface (GUI), command-line, prompt, etc.) for obtaining or providing information (e.g., data relating to scraping network sites), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The environment of the present embodiments may include any number of computer or other processing systems (e.g., client or end-user systems, server systems, etc.) and databases or other repositories arranged in any desired fashion, where the present embodiments may be applied to any desired type of computing environment (e.g., cloud computing, client-server, network computing, mainframe, stand-alone systems, etc.). The computer or other processing systems employed by the present embodiments may be implemented by any number of any personal or other type of computer or processing system (e.g., desktop, laptop, PDA, mobile devices, etc.), and may include any commercially available operating system and any combination of commercially available and custom software (e.g., machine learning software, etc.). These systems may include any types of monitors and input devices (e.g., keyboard, mouse, voice recognition, etc.) to enter and/or view information.

It is to be understood that the software of the present embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present embodiments may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information (e.g., data relating to contact center interaction routing). The database system may be implemented by any number of any conventional or other databases, data stores or storage structures (e.g., files, databases, data structures, data or other repositories, etc.) to store information (e.g., data relating to contact center interaction routing). The database system may be included within or coupled to the server and/or client systems. The database systems and/or storage structures may be remote from or local to the computer or other processing systems, and may store any desired data (e.g., data relating to contact center interaction routing).

The embodiments presented may be in various forms, such as a system, a method, and/or a computer program product at any possible technical detail level of integration. The computer program product may include a computer readable storage medium (or media) having computer readable program instructions thereon for causing a processor to carry out aspects of presented herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD- ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects presented herein.

Aspects of the present embodiments are described herein with reference to flowchart illustrations and/or block diagrams of methods, apparatus (systems), and computer program products according to the embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In summary, in one form, a method is provided. The method includes booting a computer system from a BIOS image stored in a first boot flash device; detecting an indication of a pending BIOS upgrade; in response to detecting the indication of a pending BIOS upgrade, accessing an upgraded BIOS image stored on a second boot flash device; validating a version of the upgraded BIOS image; authenticating the upgraded BIOS image using a signature stored in a first region of the second boot flash device; when the version of the upgraded BIOS image is validated, and the upgraded BIOS image is authenticated, writing the signature to a second region of the second boot flash device that is different from the first region; locking the second region of the second boot flash device; and rebooting the computer system from the second boot flash device.

In an embodiment, the method may further include initially designating the first boot flash device from the first boot flash device and the second boot flash device as an active boot flash device.

In another embodiment, the method may still further include receiving, from an operating system running on the computer system, the indication of a pending BIOS upgrade.

In another embodiment, the method may also include allowing the operating system to write another upgraded BIOS image to an unlocked corresponding second region of the first boot flash device.

In still another embodiment, the method may include validating a version of the upgraded BIOS image comprises comparing a version number of the upgraded BIOS image with a version number in a trusted database In another embodiment, the method may include clearing the indication of a pending BIOS upgrade after writing the signature to a second region of the second boot flash device that is different from the first region.

In another embodiment, the method may also include controlling a multiplexer that is disposed between a processor of the computer system and each of the first boot flash device and the second boot flash device to cause the processor to be connected to one of the first boot flash device and the second boot flash device at a time.

In another embodiment, the method may also include booting the computer system from the first boot flash device comprises authenticating the BIOS image stored in the first boot flash device.

In another embodiment, the method may also include preventing the operating system from writing to selected regions of the second boot flash device by locking the selected regions.

And the method may be performed by a field programmable gate array (FPGA).

In another form, a device may also be provided in accordance with an embodiment. The device may include a memory; and one or more processors coupled to the memory, and configured to: boot a computer system from a BIOS image stored in a first boot flash device; detect an indication of a pending BIOS upgrade; in response to detecting the indication of a pending BIOS upgrade, access an upgraded BIOS image stored on a second boot flash device; validate a version of the upgraded BIOS image; authenticate the upgraded BIOS image using a signature stored in a first region of the second boot flash device; when the version of the upgraded BIOS image is validated, and the upgraded BIOS image is authenticated, write the signature to a second region of the second boot flash device that is different from the first region; lock the second region of the second boot flash device; and reboot the computer system from the second boot flash device.

In an embodiment the one or more processors may be configured to initially designate the first boot flash device from the first boot flash device and the second boot flash device as an active boot flash device.

In an embodiment the one or more processors may be configured to receive, from an operating system running on the computer system, the indication of a pending BIOS upgrade.

In an embodiment the processors may be further configured to allow the operating system to write another upgraded BIOS image to an unlocked corresponding second region of the first boot flash device.

In an embodiment the processors may be further configured to validate the version of the upgraded BIOS image by comparing a version number of the upgraded BIOS image with a version number in a trusted database.

In an embodiment the processors may be further configured to clear the indication of a pending BIOS upgrade after writing the signature to a second region of the second boot flash device that is different from the first region In still another form, a non-transitory computer readable storage media is provided that is encoded with instructions that, when executed by a processor, cause the processor to boot a computer system from a BIOS image stored in a first boot flash device; detect an indication of a pending BIOS upgrade; in response to detecting the indication of a pending BIOS upgrade, access an upgraded BIOS image stored on a second boot flash device; validate a version of the upgraded BIOS image; authenticate the upgraded BIOS image using a signature stored in a first region of the second boot flash device; when the version of the upgraded BIOS image is validated, and the upgraded BIOS image is authenticated, write the signature to a second region of the second boot flash device that is different from the first region; lock the second region of the second boot flash device; and reboot the computer system from the second boot flash device.

The instructions may further include instructions that, when executed by a processor, cause the processor to initially designate the first boot flash device from the first boot flash device and the second boot flash device as an active boot flash device.

The instructions may further include instructions that, when executed by the processor, cause the processor to receive, from an operating system running on the computer system, the indication of a pending BIOS upgrade.

The instructions may further include instructions that, when executed by the processor, cause the processor to allow the operating system to write another upgraded BIOS image to an unlocked corresponding second region of the first boot flash device.

The above description is intended by way of example only. Various modifications and structural changes may be made therein without departing from the scope of the concepts described herein and within the scope and range of equivalents of the claims.

What is claimed is:

1. A method comprising:
    booting a computer system from a first basic input output system (BIOS) image stored in a first boot flash device;
    detecting an indication of a pending BIOS upgrade;
    in response to detecting the indication of a pending BIOS upgrade, accessing an upgraded BIOS image stored on a second boot flash device;
    validating the upgraded BIOS image;
    authenticating the upgraded BIOS image using a signature of the upgraded BIOS image stored in a first region of the second boot flash device;
    when the upgraded BIOS image is validated, and the upgraded BIOS image is authenticated, writing the signature of the upgraded BIOS image to a second region of the second boot flash device that is different from the first region;
    locking the second region of the second boot flash device; and
    rebooting the computer system from the second boot flash device,
    wherein, the detecting is performed while the first boot flash device has stored therein the first BIOS image in a locked first region of the first boot flash device and a signature of the first BIOS image in a locked second region of the first boot flash device, and the second boot flash device has stored therein a signature of a prior BIOS image in the second region of the second boot flash device that is locked, the upgraded BIOS image in an unlocked third region of the second boot flash device, and a signature of the upgraded BIOS image in the first region of the second boot flash device that is unlocked.

2. The method of claim 1, further comprising initially designating, as an active boot flash device, the first boot flash device from a set comprising the first boot flash device and the second boot flash device.

3. The method of claim 1, further comprising receiving, from an operating system running on the computer system, the indication of a pending BIOS upgrade.

4. The method of claim 3, further allowing the operating system to write another upgraded BIOS image to an unlocked corresponding second region of the first boot flash device.

5. The method of claim 1, wherein validating the upgraded BIOS image comprises comparing a version number of the upgraded BIOS image with a version number in a trusted database.

6. The method of claim 1, further comprising clearing the indication of a pending BIOS upgrade after writing the signature to the second region of the second boot flash device that is different from the first region.

7. The method of claim 1, further comprising controlling a multiplexer that is disposed between a processor of the computer system and each of the first boot flash device and the second boot flash device to cause the processor to be connected to one of the first boot flash device and the second boot flash device at a time.

8. The method of claim 1, wherein booting the computer system from the first boot flash device comprises authenticating the BIOS image stored in the first boot flash device.

9. The method of claim 1, further comprising preventing an operating system running on the computer system from writing to selected regions of the second boot flash device by locking the selected regions.

10. The method of claim 1, wherein the method is performed by a field programmable gate array (FPGA).

11. A device comprising:
a memory; and
one or more processors coupled to the memory, and configured to:
boot a computer system from a first basic input output system (BIOS) image stored in a first boot flash device;
detect an indication of a pending BIOS upgrade;
in response to detecting the indication of a pending BIOS upgrade, access an upgraded BIOS image stored on a second boot flash device;
validate the upgraded BIOS image;
authenticate the upgraded BIOS image using a signature of the upgraded BIOS image stored in a first region of the second boot flash device;
when the upgraded BIOS image is validated, and the upgraded BIOS image is authenticated, write the signature to a second region of the second boot flash device that is different from the first region;
lock the second region of the second boot flash device; and
reboot the computer system from the second boot flash device,
wherein, the processor is configured to detect the indication of the pending BIOS upgrade while the first boot flash device has stored therein the first BIOS image in a locked first region of the first boot flash device and a signature of the first BIOS image in a locked second region of the first boot flash device, and the second boot flash device has stored therein a signature of a prior BIOS image in the second region of the second boot flash device that is locked, the upgraded BIOS image in an unlocked third region of the second boot flash device, and a signature of the upgraded BIOS image in the first region of the second boot flash device that is unlocked.

12. The device of claim 11, wherein the one or more processors are further configured to initially designate, as an active boot flash device, the first boot flash device from a set comprising the first boot flash device and the second boot flash device.

13. The device of claim 11, wherein the one or more processors are further configured to receive, from an operating system running on the computer system, the indication of a pending BIOS upgrade.

14. The device of claim 13, wherein the one or more processors are further configured to allow the operating system to write another upgraded BIOS image to an unlocked corresponding second region of the first boot flash device.

15. The device of claim 11, wherein the one or more processors are further configured to validate the upgraded BIOS image by comparing a version number of the upgraded BIOS image with a version number in a trusted database.

16. The device of claim 11, wherein the one or more processors are further configured to clear the indication of a pending BIOS upgrade after writing the signature to the second region of the second boot flash device that is different from the first region.

17. A non-transitory computer readable storage media encoded with instructions that, when executed by a processor, cause the processor to:
boot a computer system from a first basic input output system (BIOS) image stored in a first boot flash device;
detect an indication of a pending BIOS upgrade;
in response to detecting the indication of a pending BIOS upgrade, access an upgraded BIOS image stored on a second boot flash device;
validate the upgraded BIOS image;
authenticate the upgraded BIOS image using a signature of the upgraded BIOS image stored in a first region of the second boot flash device;
when the version of the upgraded BIOS image is validated, and the upgraded BIOS image is authenticated, write the signature to a second region of the second boot flash device that is different from the first region;
lock the second region of the second boot flash device; and
reboot the computer system from the second boot flash device,
wherein, the instructions cause the processor to detect the indication of the pending BIOS upgrade while the first boot flash device has stored therein the first BIOS image in a locked first region of the first boot flash device and a signature of the first BIOS image in a locked second region of the first boot flash device, and the second boot flash device has stored therein a signature of a prior BIOS image in the second region of the second boot flash device that is locked, the upgraded BIOS image in an unlocked third region of the second boot flash device, and a signature of the upgraded BIOS image in the first region of the second boot flash device that is unlocked.

18. The non-transitory computer readable storage media of claim 17, the instructions further including instructions that, when executed by the processor, cause the processor to initially designate, as an active boot flash device, the first boot flash device from a set comprising the first boot flash device and the second boot flash.

19. The non-transitory computer readable storage media of claim 17, the instructions further including instructions that, when executed by the processor, cause the processor to receive, from an operating system running on the computer system, the indication of a pending BIOS upgrade.

20. The non-transitory computer readable storage media of claim 19, the instructions further including instructions that, when executed by the processor, cause the processor to allow the operating system to write another upgraded BIOS image to an unlocked corresponding second region of the first boot flash device.

\* \* \* \* \*